United States Patent Office 3,511,809
Patented May 12, 1970

3,511,809
POLYESTERS FROM p-ARYLENE-BIS (DIMETHYL ACETIC ACID)
Milton J. Hogsed, Kinston, N.C., Richard K. Quisenberry, Seaford, Del., and Richard D. Weimar, Jr., Grifton, N.C., assignors to E. I. du Pont de Nemours and Company, Wilmington, Del., a corporation of Delaware
No Drawing. Filed July 26, 1968, Ser. No. 747,821
Int. Cl. C08g 33/10; 17/08; C07c 63/00
U.S. Cl. 260—47                                9 Claims

ABSTRACT OF THE DISCLOSURE

Fiber-forming linear polyesters characterized by recurring units of the structural formula

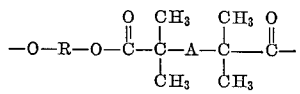

wherein A is a divalent aromatic radical from the class of p-phenylene and p,p'-biphenylene, and R is a divalent organic radical of from 6 to 20 carbon atoms having at least 1 6-membered carbocyclic nucleus.

BACKGROUND OF THE INVENTION

Field of the invention

This invention relates to a novel class of moldable linear polyesters, as well as to fibers, films, and other shaped articles produced therefrom, and is more particularly concerned with stable polyesters derived from a hindered aliphatic dicarboxylic acid containing at least one aromatic ring in the acid molecule.

Description of the prior art

The early work on polyesters, such as that described by W. H. Carothers in U.S. 2,012,267 was directed primarily to polyesters prepared from aliphatic compounds. Such polyesters, as well as many polyesters derived from aromatic dicarboxylic acids such as the orthophthalate polyesters, are generally characterized by low melting points and very low softening points. Some of the polyesters are actually liquid at room temperature, while many others melt or at least soften below the boiling point of water. The investigations of Whinfield & Dickson as described in U.S. Pat. 2,465,319 resulted in high melting crystalline polyesters suitable for the production of textile fibers and films having many desirable properties. These polyesters are derived from aromatic para-dicarboxylic acids, with the best known commercial example being terephthalic acid. In such aromatic acids, the carboxy group is, of course, connected directly to the aromatic ring. Attempts to prepare improved polyesters in which aromatic groups are included in an aliphatic dicarboxylic acid, i.e., an acid in which the carboxyl group is connected to an aliphatic carbon, have usually resulted in disappointing properties. For example, many such polyesters are deficient in both hydrolytic stability and thermal stability. The present invention overcomes these deciencies.

SUMMARY OF THE INVENTION

In accordance with this invention, it has been found that valuable linear polyesters may be prepared from p-phenylene-bis-dimethylacetic acid and p-diphenylene-bis-dimethylacetic acid. Polyesters of this class are stable at temperatures above their melting points, have high second order transition temperatures, are relatively easily crystallizable, and may be molded or extruded into useful articles with desirable properties. They are particularly desirable because of their superior resistance to hydrolytic and thermal degradation.

The novel linear polyesters of the invention may be illustrated as possessing recurring units of the following structural formula:

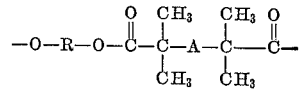

in which A is a divalent aromatic radical from the class consisting of phenylene and biphenylene, and R is a divalent organic radical containing from 2 to about 20 carbon atoms. Thus, R may be an arylene, aralkylene or alkylene (including cycloalkylene) radical of 2 to about 20 carbon atoms derived from a glycol or a dihydric phenol of the formula $R(OH)_2$. Preferably R is an arylene group such as phenylene, diphenylene, or a radical such as isopropylidine-4,4'-diphenylene. The polyesters are prepared by reacting the acid, p-phenylene-bis-dimethylacetic acid or p-biphenylene-bis-dimethylacetic acid, or an ester-forming derivative thereof, with a suitable dihydroxy compound or an ester-forming derivative thereof. Usually it is preferred that the linear polyester have an inherent viscosity of at least 0.3, as measured in solution at 25° C. in a 1:3 mixture of trifluoracetic acid and methylene chloride.

A convenient method for preparing the polyesters of the invention, especially when the diol is an aromatic diol, involves first preparing a diester of the dihydroxy compound using a low molecular weight monocarboxylic acid such as acetic acid. Then this ester is heated with the dicarboxylic acid, i.e., p-phenylene-bis-dimethylacetic acid or p-biphenylene-bis-dimethylacetic acid, for a suitable period of time, with the final part of the heating being carried out at very low pressure. An inert gas may be bubbled through the mixture to assist in removal of the monocarboxylic acid which is released during the reaction. The reaction may be carried out in the presence of a suitable basic catalyst such as sodium acetate, potassium acetate, lithium acetate, sodium hydroxide and calcium acetate.

In the polymerization reaction, minor amounts (i.e., up to about 10 mole percent) of other dihydroxy compounds and other dicarboxylic acids may be present. Suitable other dihydroxy compounds include resorcinol, dihydroxydiphenyl sulfone, dihydroxydiphenyl, dihydroxydiphenylmethane, diphenylolpropane and tetrachlorodiphenylolpropane. Suitable other dicarboxylic acids include $\alpha,\alpha,\alpha',\alpha'$-tetramethylpimelic, terephthalic, isophthalic, bibenzoic and naphthalene-2,6-dicarboxylic acid.

DESCRIPTION OF PREFERRED EMBODIMENTS

The expression "polymer melt temperature" (PMT) employed with respect to the products of this invention is the minimum temperature at which a sample of the polymer leaves a wet molten trail as it is stroked with moderate pressure across a smooth surface of heated metal. "Polymer melt temperature" has sometimes in the past been referred to as "polymer stick temperature."

The term "inherent viscosity" as used herein is defined by the expression $$\frac{\ln \eta r}{c.}$$

where $\eta r$ is the ratio of the drop time of the solution to the drop time of the solvent, both measured at 25° C., and c. is the solution concentration of 0.32 gm. polymer per 100 ml. solution. The solvent used is a 1:3 (by volume) mixture of trifluoracetic acid and methylene chloride. Inherent viscosity is a measure of polymer molecular weight.

EXAMPLE I

The following procedure is used to prepare α,α,α',α'-tetramethyl-1,4'-phenylenediacetic acid.

In a 250 ml. flask equipped with a stirrer, an addition funnel, and a thermometer are placed 75 ml. water, 3.50 g. (0.0530 mole) of 85% potassium hydroxide, and 5.91 g. (0.0266 mole) of p-bis(hydroxy-t-butyl)benzene. After warming the mixture of 90–100° C. in a bath, a solution of 7.43 g. (0.0470 mole) potassium permanganate in 100 ml. of water is added with stirring over a 1.5 hr. period. The solution is allowed to stand at room temperature for two days, then about 10 g. of metasodium bisulfite is added, causing the mixture to turn pink. The reaction mixture is then made strongly basic with sodium hydroxide, filtered, and acidified to a pH of about 1 with concentrated hydrochloric acid. The crude white p-phenylene-bis-dimethylacetic acid which forms is collected by filtration, washed with water, and air dried. The 3.93 g. of product which is obtained has a melting point of about 250–255° C.

The product is recrystallized from ethanol, ethyl acetate, and again from ethanol to give the pure dibasic acid. The melting point of the acid, measured in a sealed tube at a temperature rise of 3° per minute, is found to be 269.5–270.3° C.

*Analysis.*—Calc'd for $C_{14}H_{18}O_4$ (percent): C, 67.18; H, 7.25. Found (percent): C, 67.4; H, 6.97.

EXAMPLE II

The following procedure is used to prepare α,α,α',α'-tetramethyl-4,4'-biphenylenediacetic acid.

In a solution of 23 g. potassium hydroxide in 200 ml. water, in a 500 ml., 3-neck flask with a mechanical stirrer, reflux condenser, and an additional funnel, is dissolved 24 g. α-(para-bromophenyl)isobutyric acid. After the addition of 4 g. of 1% palladium on carbon, the mixture is heated to reflux. Then, during a period of 3 hrs., a solution of 40 ml. methanol and 160 ml. water is added very slowly, while a gentle reflux is maintained. After the addition is complete, the reaction mixture is refluxed for an additional hour. The hot solution is then filtered, cooled in ice, and acidified slowly, with stirring, with concentrated hydrochloric acid. The precipitate is filtered and dried. (Concentrating the filtrate to about ⅓ its original volume gives additional precipitate.) Recrystallization of the precipitate from a minimum amount of methanol yields 11.7 g. of the biphenyl derivative, melting point 278–279° C., which is identified by infrared and mass spectra as α,α,α',α'-tetramethyl-4,4'-diphenylenediacetic acid.

EXAMPLE III

Preparation of polyester from p,p'-dihydroxybiphenyl and tetramethyl-p-phenylenediacetic acid.

A polymer tube is charged with 6.51 g. (0.025 mole) α,α,α',α'-tetramethyl-p-phenylenediacetic acid, 6.76 g. (0.025 mole) 4,4'-diacetoxybiphenyl and 0.2 g. of potassium acetate. A capillary bubbler tube is inserted in the polymer tube and nitrogen gas passed through the mixture. The acidolysis reaction is carried out by heating the mixture for 1 hr. as the temperature is raised from 210° C. to 250° C. and then by heating an additional 15 min. at 250–270° C. Acetic acid is distilled from the mixture during the acidolysis reaction. The pressure in the polymer tube is then reduced to 0.1 mm. mercury and the mixture heated for 2.5 hrs. at an elevated temperature to yield an amber-colored polymer having an inherent viscosity of 0.49, a free carboxyl content of 4.0 equivalents per million gms., and a melting point of 274° C. as determined by differential thermal analysis.

EXAMPLE IV

Preparation of polyester from p,p'-dihydroxybiphenyl and tetramethyl-4,4'-biphenylenediacetic acid.

A polymer tube is charged with 9.79 g. of α,α,α',α'-tetramethyl-p,p'-biphenylenediacetic acid, 8.11 g. of p,p'-diacetoxybiphenyl, 0.3 cc. of 10% potassium acetate in methanol and 10 cc. of diphenyl ether. After melting and mixing at 250° C., a capillary tube is inserted into the mixture to provide a slow stream of nitrogen, and the acidolysis reaction is conducted at atmospheric pressure for 0.5 hr. at 250° C., 1 hr. at 260° C. and 0.5 hr. at 280° C. The pressure in the polymer tube is then reduced and polymerization continued for 3 hrs. at 280–285° C. The polyester obtained is found to have an inherent viscosity of 0.35, a free carboxyl content of 39.5 equivalents per million gms. and a melting temperature of 250° C. The polymer is soluble in methylene chloride but insoluble in benzene. The polymer is pulverized and subjected to solid-phase polymerization procedure for 20 hrs. at a temperature of 240° C. and a pressure of 0.05 mm. mercury. The resulting polymer has an inherent viscosity of 0.43, a free carboxyl content of 16.8 equivalents per million gms. and a melting point of 250° C.

EXAMPLE V

Polyester from hydroquinone and tetramethyl-p,p'-biphenylenediacetic acid.

Following the general procedure of Example IV, hydroquinone diacetate is reacted with α,α,α',α'-tetramethyl-p,p'-biphenylenediactic acid. After solid-phase polymerization reaching a maximum temperature of 220° C. at 0.05 mm. mercury pressure, the polymer produced is found to have a melting temperature of 230° C., an inherent viscosity of 0.61 and a free carboxyl content of 7.0 equivalents per million gms. A continuous monofilament yarn is melt-spun from the polymer at a temperature of 280–309° C.

EXAMPLE VI

Preparation of polyester from 1,2-bis(4-hydroxyphenyl)ethane and tetramethyl-p-diphenylenediacetic acid.

Following the general procedure of Example IV, the diacetate of 1,2-bis(4-hydroxyphenyl)ethane is reacted with α,α,α',α'-tetramethyl - p - diphenylenediacetic acid. After solid-phase polymerization, the polymeric product is found to have a polymer melting temperature of 160° C. and an inherent viscosity of 0.37.

EXAMPLE VII

Preparation of polyester from diphenylolpropane and tetramethyl-p-phenylenediacetic acid.

Following the general procedure of Example III, the diacetate of diphenylolpropane is reacted with α,α,α'α'-tetramethyl-p-phenylenediacetic acid and polymerized to a low molecular weight polymer. The polymeric product is found to have a polymer melting temperature of 175° C. and an inherent viscosity of 0.1. Higher molecular weight polymer may be obtained by subjecting this polymeric product to a solid-phase polymerization procedure.

What is claimed is:
1. A linear polyester, having an inherent viscosity of at least 0.3, consisting essentially of recurring units represented by the structural formula

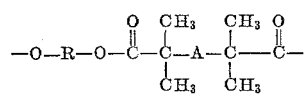

wherein A is a divalent aromatic radical selected from the class consisting of p-phenylene and p,p'-biphenylene, and R is a divalent organic radical of 6 to 20 carbon atoms and contains at least 1 aromatic nucleus said inherent viscosity being measured at 25° C. in a solution of 0.32 gm. polymer per 100 ml. of a solution wherein the solvent is a 1:3 mixture of trifluoroacetic acid and methylene chloride.

2. The polyester as in claim 1 wherein R contains a p-phenyl or a p,p'-diphenyl radical.

3. A linear polyester, having an inherent viscosity of at least 0.3, composed of at least 90 percent of recurring units as defined in claim 1 said inherent viscosity being measured at 25° C. in a solution of 0.32 gm. polymer per 100 ml. of a solution wherein the solvent is a 1:3 mixture of trifluoroacetic acid and methylene chloride.

4. Fibers of the linear polyester defined in claim 1.

5. The fiber-forming linear polyester of a mixture consisting essentially of $\alpha,\alpha,\alpha',\alpha'$-tetramethyl-p-phenylenediacetic acid and p,p'-dihydroxybiphenyl.

6. The fiber-forming linear polyester of a mixture consisting essentially of $\alpha,\alpha,\alpha',\alpha'$-tetramethyl-p,p'-biphenylenediacetic acid and p,p'-dihydroxybiphenyl.

7. The fiber-forming linear polyester of a mixture consisting essentially of hydroquinone and $\alpha,\alpha,\alpha',\alpha'$-tetramethyl-p,p'-biphenylenediacetic acid.

8. The fiber-forming linear polyester of a mixture consisting essentially of 1,2-bis(4-hydroxyphenyl)ethane and $\alpha,\alpha,\alpha',\alpha'$-tetramethyl-p-diphenylenediacetic acid.

9. The fiber-forming linear polyester of a mixture consisting essentially of diphenylolpropane and $\alpha,\alpha,\alpha',\alpha'$-tetramethyl-p-phenylenediacetic acid.

References Cited

UNITED STATES PATENTS 2,720,502    10/1955    Caldwell _____ 260—75

WILLIAM H. SHORT, Primary Examiner

L. P. QUAST, Assistant Examiner

U.S. Cl. X.R.

260—75, 515, 31.2, 33.8